United States Patent Office 3,439,530
Patented Apr. 22, 1969

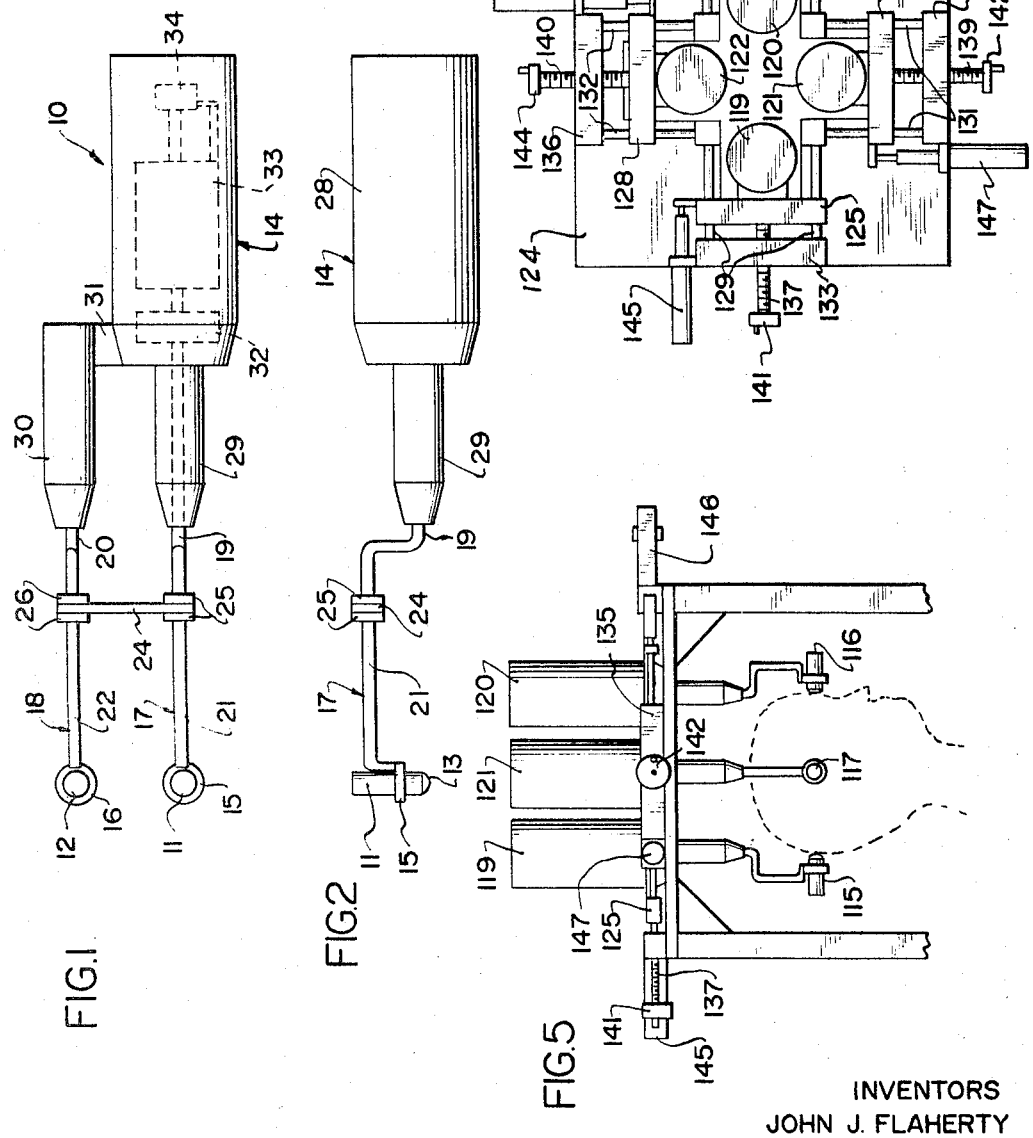

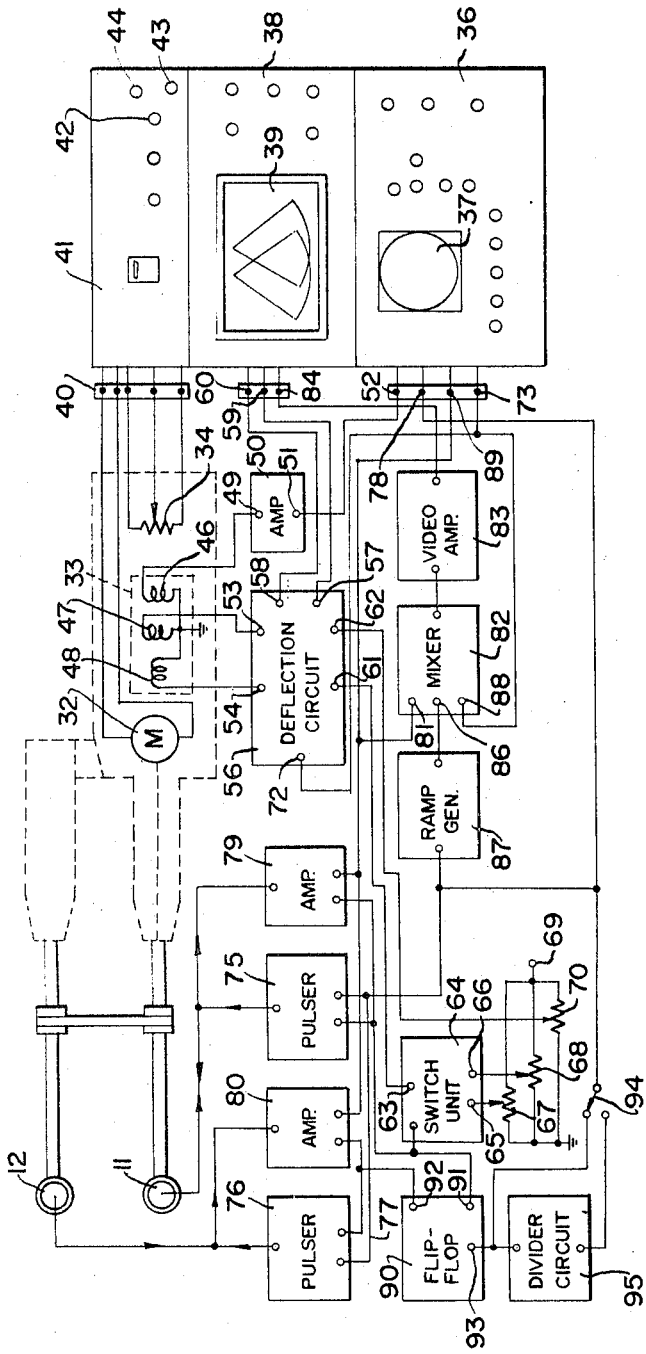
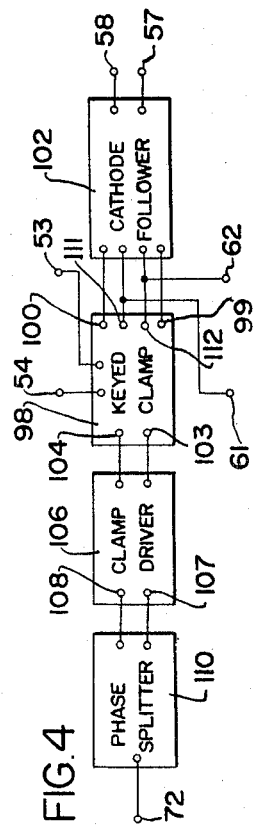
INVENTORS
JOHN J. FLAHERTY
PETER J. ROSAUER
BY
ATTORNEYS

3,439,530
MULTI-SCAN ULTRASONIC TESTING
APPARATUS
John J. Flaherty, Elk Grove Village, and Peter J.
Rosauer, Mount Prospect, Ill., assignors to Magnaflux Corporation, Chicago, Ill., a corporation of
Delaware
Filed Jan. 10, 1966, Ser. No. 519,536
Int. Cl. G01n 9/24
U.S. Cl. 73—67.8                         17 Claims

ABSTRACT OF THE DISCLOSURE

Ultrasonic testing apparatus in which a plurality of transducers are oscillated to produce transverse scanning movements of beams through portions of a body, B-scan indications being produced on an oscilloscope screen in spacial relation corresponding to the portions of the body scanned. The portions of the body scanned preferably overlap so that the indications reinforce one another and the effects of noise and extraneous indications are minimized.

---

This invention relates to ultrasonic testing apparatus and more particularly to pulse-echo ultrasonic apparatus with which relatively large areas can be scanned at a rapid rate and which produces clear, accurate and readily interpreted indications with the effects of various extraneous signals being minimized, while being comparatively simple, inexpensive, compact and reliable in operation.

Although many features of the invention have other applications, the systems illustrated herein were particularly designed for use as medical diagnostic systems for examination of the interior of the human body. Various pulse-echo ultrasonic systems have heretofore been proposed for such use, wherein a transducer is moved in a direction generally parallel to a body surface while transmitting pulses of ultrasonic energy toward the surface and receiving echoes back from interfaces within the body, with a "B-scan" display being produced on the face or screen of a cathode ray tube by producing a trace in one direction in synchronism with the transmission of the pulses and by moving the trace in a transverse direction in synchronism with the transducer movement, the echo signals being used to intensify the spot on the screen of the cathode ray tube.

Such systems have been used to obtain a cross-sectional indication of the structure of a human breast, with the transducer and the breast immersed in a water chamber to provide acoustical coupling between them while permitting the scanning movement of the transducer.

It has been possible with such systems to detect malignant tumors with some degree of success. Such systems have, however, presented difficulties particularly in regard to obtaining the required scanning movement of the transducer.

In addition, the prior art systems have presented difficulties in that interfaces to be detected may not be normal to the ultrasonic beam and also false indications are produced by multiple reflections between interfaces within the body. In an attempt to minimize such difficulties, a compound scan system has been proposed wherein the transducer is oscillated through a short distance at a rapid rate while being moved in an arcuate path at a relatively slow rate. With such compound scan systems, difficulties due to non-normal interfaces and multiple reflections can be reduced, but very cumbersome apparatus is required to produce the required scanning.

This invention was evolved with the general object of overcoming the disadvantages of prior art systems and of providing a system with which relatively large areas can be rapidly scanned while producing clear, accurate and readily interpreted indications.

According to this invention, a plurality of transducer means are provided for transmitting ultrasonic energy in beams into a body under test and for receiving echoes from inhomogeneities within the body to develop echo signals, and such transducer means are oscillated to produce transverse scanning movements of the beams through portions of the body, with indicating means being provided responsive to the echo signals and the oscillatory movements of the transducer means. With this arrangement, a relatively large area can be scanned at a rapid rate.

The indicating means preferably include means for presenting a plurality of B-scan indications having a spacial relation corresponding to the spacial relation of the portions of the body scanned by the beams, and in accordance with a specific feature of the invention, the sweeping motions of the beams are such that a part of the portion of the body scanned by each beam is also scanned by another of the beams. With this arrangement, the indications produced from the plurality of transducer means reinforce one another and the effects of extraneous indications are minimized, particularly those resulting from multiple reflections between interfaces within the body.

According to a further feature of the invention, the scanning movements are effected at a rate of at least 15 scanning movements per second, which permits examination of moving parts and which is particularly advantageous in a medical diagnostic system in which moving organs, such as the heart, are examined.

The oscillatory movements of the plurality of transducer means are preferably effected about spaced generally parallel axes. This results in a distinct advantage when a liquid couplant is used, in that the oscillatory movements produce minimum turbulence as compared to the turbulence produced when a back-and-forth rectilinear oscillatory movement is used. A further advantage is that end faces of the transducer means can be effectively engaged directly with spaced surface portions of the body, with the oscillatory movements being effected about axes generally parallel to the engaged surface portions and in approximate alignment with the end faces. Thus, for example, the interior of a living body may be scanned effectively, without requiring the effective immersion of the body and the transducer means.

The ultrasonic testing system of this invention can be advantageously used for the examination of the head with the end face of one transducer engaged with one side of the head and the end face of another transducer engaged with one end of the head. Preferably, four transducers may be used, with one pair engaged with opposite sides of the head and with the other pair engaged with opposite ends of the head. In accordance with a specific feature, the transducers are adjustably supported on frame means with means being provided responsive to adjustable movement of the transducers for automatically obtaining a spacial relation of the indications corresponding to the spacial relation of the transducers.

In one embodiment of the invention, the transducer means are mechanically interconnected for synchronized oscillatory movement about generally parallel axes. This arrangement has an advantage in that the construction may be simplified, and also the generation of the required electrical signals for application to the indicating means is simplified.

In another embodiment of the invention, the oscillating means include separate drive units for independently oscillating the transducer means. This embodiment requires additional components, but results in greater flexibility in use of the system.

Additional important features of the invention relate to specific mechanical arrangements for obtaining the required oscillatory movements, and in electrical circuit arrangements for generating the signals to obtain proper correlation of the indications.

This invention contemplates other and more specific objects, features and advantages which will become more fully apparent from the following detailed description taken in conjunction with the accompanying drawings which illustrate preferred embodiments and in which:

FIGURE 1 is a top plan view of one embodiment of a transducer assembly constructed in accordance with the principles of this invention;

FIGURE 2 is a side elevational view of the assembly of FIGURE 1;

FIGURE 3 is a schematic circuit diagram of a system for energizing transducers of the assembly as shown in FIGURE 1, and for producing indications therefrom;

FIGURE 4 is a block diagram of a deflection circuit of the circuit of FIGURE 3;

FIGURE 5 is a side elevational view of another embodiment of a transducer assembly, designed for testing of a head;

FIGURE 6 is a top plan view of the assembly of FIGURE 5; and

Figure 7:
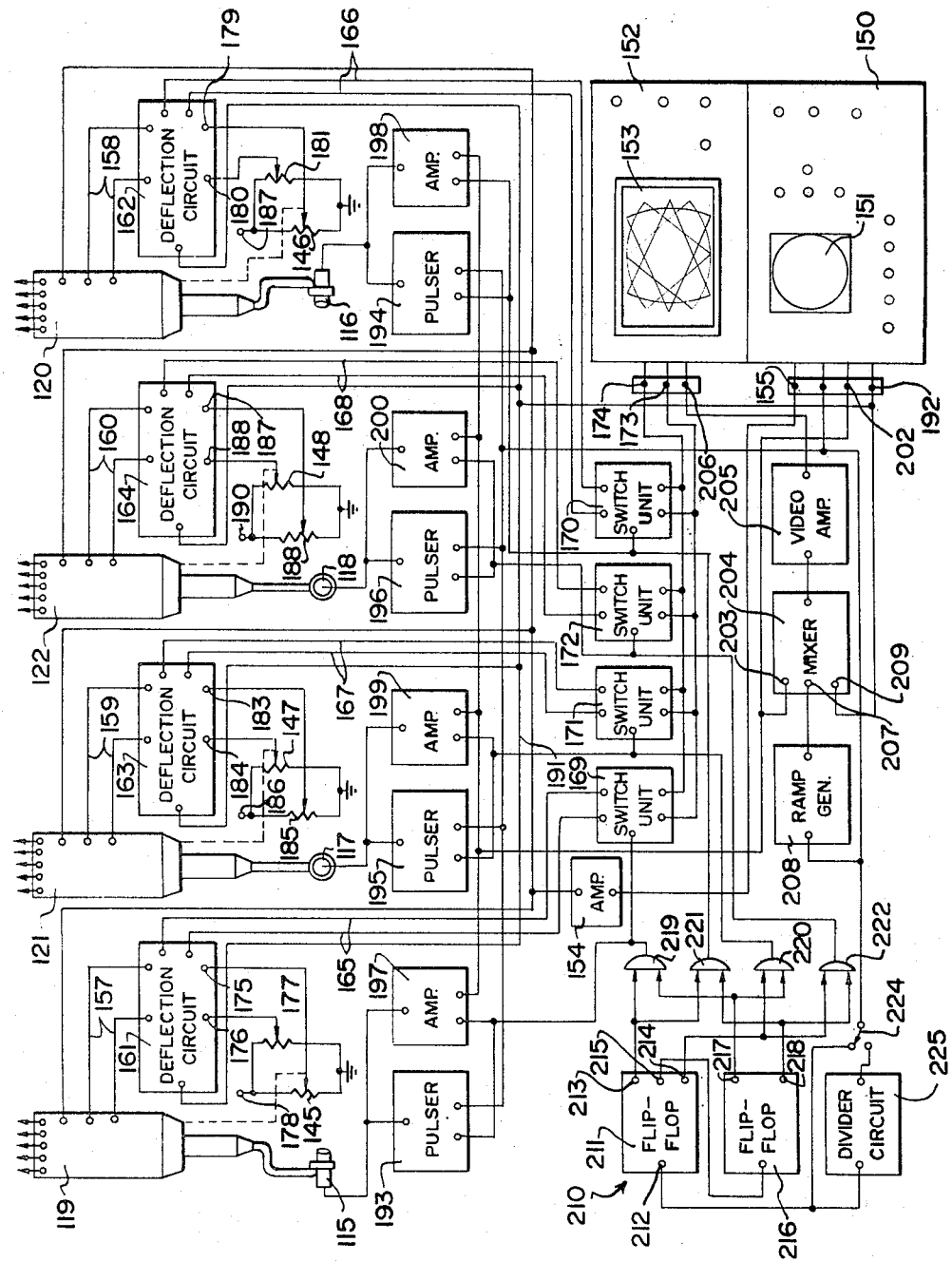
FIGURE 7 is a schematic circuit diagram of a system for energizing the transducers of the assembly of FIGURES 5 and 6 and for developing indications therefrom.

Reference numeral 10 generally designates an ultrasonic transducer assembly constructed in accordance with the principles of this invention. Although having other applications, the assembly 10 is particularly designed for use in a medical diagnostic system and may be used, for example, in the examination of the heart.

The assembly 10 comprises two transducers 11 and 12 having end faces 13 for transmission and reception of ultrasonic waves, with a unit 14 being provided for effecting oscillatory movement of the transducers 11 and 12 about spaced parallel axes in approximate alignment with the end faces of the transducers 11 and 12. In the examination of the heart, the end faces of the transducers may be engaged with spaced surface portions of the chest, preferably with a thin film of liquid or a semi-solid being provided to insure good acoustical coupling. It is also possible, however, to use a liquid coupling medium between the transducer end faces and the surface of the body being tested.

The transducers preferably have a construction in which the end faces 13 are convex to provide a rolling contact with the skin and to facilitate a rapid scanning operation. At the same time, materials are used having acoustical chracteristics such as to focus the ultrasonic energy into concentrated beams for improved performance.

To support and oscillate the transducers 11 and 12, they are carried by clamp rings 15 and 16 at the ends of shafts 17 and 18 which have opposite ends 19 and 20 journaled for oscillatory movement about parallel axes in approximate alignment with the transducer end faces. The shafts 17 and 18 have intermediate portions 21 and 22 offset from the axes of oscillatory movement and interconnected by a link 24, so that the oscillatory movements are synchronized. Suitable collars 25 and 26 are provided on the portions 21 and 22 to prevent axial displacement of the link 24.

The unit 14 comprises a generally cylindrical housing 28 having a reduced diameter sleeve-like end portion 29 in which the shaft end portion 19 is journaled by suitable bearings. A sleeve-like portion 30 similar to portion 29 journals the end portion 20 of the shaft 18 and is supported from the housing through a connecting portion 31.

To oscillate the shaft 17, and thereby oscillate the shaft 18 through the link 24, the terminal end of the end portion 19 of the shaft 17 is connected to a rotor of a motor 32, and also to a resolver 33 and a potentiometer 34 within the housing 28, as indicated in dotted lines in FIGURE 1. The support of the shafts and the interconnection with the motor 32, resolver 33 and potentiometer 34, and other details of construction, may preferably be the same as disclosed in our copending application entitled "Ultrasonic Transducer System," filed Oct. 24, 1965, U.S. Ser. No. 504,346.

FIGURE 3 is a schematic circuit diagram of a system for energizing the transducers 11 and 12 and displaying indications produced therefrom. The system comprises an "A-scan" indicator unit 36 including a cathode ray tube having a face or screen 37. A spot of light produced on the screen 37 is deflected horizontally by a sawtooth wave synchronized with pulsing of the transducers 11 and 12, while received echo signals are used to deflect the spot in a vertical direction, to produce "pips" on the screen 37. The positions of such pips, measured from the left side of the screen 37, are measures of the depths within the body of the interfaces producing the echo signals.

The system further includes a "B-scan" unit 38 including a cathode ray tube having a face or screen 39 on which cross-sectional patterns are produced in spacial relation corresponding to the special relation of portions of the body scanned by the oscillating transducers 11 and 12. To produce such cross-sectional patterns, a spot on the screen 39 is deflected in synchronism with the pulsing of the transducers to produce traces on the screen, preferably starting at points adjacent the upper edge of the screen and moving downwardly, while the position of the traces are controlled in accordance with the respective positions of the transducers 11 and 12 during oscillation thereof. The intensity of the spot, meanwhile, is controlled in response to the echo signals developed by the transducers.

To control oscillation of the transducers 11 and 12, the motor 32 and the potentiometer 34 are connected to terminals of a board or jack 40 of a control unit 41 which, although having a number of desirable and advantageous features, forms no part of the present invention, and is therefore not described or illustrated in detail. It may be noted, however, that the unit 41 includes an adjustable speed control knob 42, an angle control knob 43 which controls the angle of oscillatory movement, and an attitude control knob 44 which controls the mean angle of the oscillatory movement.

The resolver 33 is effective to translate angular movement of the shaft 17 into electrical signals for correlating indications on the screen 39 with the oscillation of the shaft 17. In particular, the resolver 33 includes a stator coil 46 and a pair of rotor coils 47 and 48 located at right angles to each other and inductively coupled to the stator coil 46, to generate signals having sine and cosine functions of a signal applied to the stator coil 46.

Stator coil 46 is connected to an output terminal 49 of an amplifier 50 having an input terminal 51 connected to a terminal 52 of the unit 36. An internal sweep circuit of the unit 36 operates to generate a sawtooth signal at the terminal 52 which is amplified by the amplifier 50 and applied to the stator coil 46. The rotor coils 47 and 48 then develop corresponding sawtooth signals, having amplitudes which are sine and cosine functions of the angular position of the shaft 17. It will be understood, of course, that the system may use forms of resolvers other than the inductive type resolver illustrated.

Rotor coils 47 and 48 are respectively coupled to input terminals 53 and 54 of a deflection circuit 56 having output terminals 57 and 58 connected to terminals 59 and 60 of the unit 38, which are connected directly or through amplifier circuits in the unit 38 to the horizontal and vertical deflection plates or coils of the cathode ray tube therein. In the system as illustrated, the terminal 59 is connected to the horizontal deflection circuit and is controlled from the signal developed by coil 47, while terminal 60 is connected to the vertical deflection circuit and is controlled by the signal from coil 48.

The system may be operated in a manner such that with the axes of the transducers 11 and 12 in vertical positions, the coil 47 is at right angles to the stator coil 46, so that no signal is applied to the horizontal deflection input terminal 59, while the coil 48 is aligned with the stator coil 46 to generate a maximum signal which is applied to the vertical deflection input terminal 60. A vertical trace is then developed on the screen 39 starting at an apex point adjacent the upper edge thereof and moving downwardly under control of the sawtooth sweep signal. With the transducers moving away from such vertical positions, signals are then developed by the rotor coil 47 which is applied to cause a sawtooth horizontal deflection signal of small amplitude to be applied at terminal 59 along with the larger amplitude vertical deflection signal. The trace then moves angularly downwardly and either to the left or the right depending upon the direction of displacement of the transducers from such vertical positions. With further movement away from such vertical positions, the amplitude of the horizontal deflection signal is increased, while the amplitude of the vertical deflection signal is decreased, so that the position of the trace on the screen accurately corresponds to the angular positions of the transducers 11 and 12. Accordingly, when the transducers are oscillated, traces are produced on the screen 39 which are caused to sweep through arcs about apexes adjacent the upper end of the screen 39, to produce sector scan indications. The positions of the apex points are controlled by voltages applied to input terminals 61 and 62 of the deflection circuit 56. The horizontal position of the apex is controlled by the voltage terminal 61 which is connected to an input terminal 63 of a switch unit 64 having output terminals 65 and 66 connected to movable contacts of potentiometers 67 and 68 which are connected between ground and a power supply terminal 69. The vertical position is controlled by the voltage at terminal 62 which is connected to the movable contact of a potentiometer 70 connected between ground and the terminal 69.

In operation, the switch unit 64 operates to connect terminal 61 to the movable contact of potentiometer 67 during operation of the transducer 11, and to connect terminal 61 to the movable contact of potentiometer 68 during operation of the transducer 12. The potentiometers 67 and 68 may thus be adjusted to develop different voltages corresponding to the spacing between the axes of the oscillatory movements of the transducers 11 and 12. The potentiometer 70 is adjusted to adjust the vertical position of both apexes, preferably at points adjacent the upper edge of the screen 39.

The deflection circuit 56 further includes a terminal 72 which is connected to a terminal 73 of the unit 36, to receive an unblanking pulse therefrom. The construction of the deflection circuit 56 is illustrated in FIGURE 4, and is described in more detail herein below.

The transducers 11 and 12 are connected to the outputs of pulsers 75 and 76 having inputs connected together and to a line 77 which is connected to a terminal 78 of the unit 36, a timing signal being generated at terminal 78 by timing and sweep generating circuitry of a type conventional in the oscilloscope art, within the unit 36. The transducers 11 and 12 are additionally connected to input terminals of a pair of amplifiers 79 and 80 having output terminals connected to an input terminal 81 of a mixer 82 having an output terminal connected to an input terminal of a video amplifier 83 which has an output terminal connected to a terminal 84 of the unit 38. Terminal 84 is connected either directly or through an amplifier in the unit 38 to the grid of the cathode ray tube therein to intensify the electron beam and brighten the spot in response to echo signals produced by the transducers 11 and 12.

A second input terminal 86 of the mixer 82 is connected to the output of a ramp generator 87 having an input connected to the terminal 78 of the unit 36. Ramp generator 87 is of a type known in the radar art and applies a signal to increase the amplification of echo signals in proportion to the distance from the transducer so as to compensate for attenuation of signals and also to compensate for the fact that with the sector scan, the separation of trace lines increases in proportion to the distance from the transducer. A third input terminal 88 of the mixer 82 is connected to the terminal 73 of the unit 36, for application of an unblanking signal thereto.

An additional terminal 89 of the unit 36 is connected to the outputs of amplifiers 79 and 80 for application of the video signal to the unit 36.

An important feature of the system is in the provision of cyclically operable control signal generator means for controlling the pulsing of the transducers, the gating of echo signals to the oscilloscope and the deflection of the oscilloscope spot, in a manner such as to present B-scan indications from the transducers with a spacial relation corresponding to the spacial relation of the portions of the body scanned by the beams.

In particular, the system illustrated in FIGURE 3 comprises control signal generating means including a bistable or flip-flop circuit 90 having a first output terminal 91 connected to inputs of the pulser 75 and the amplifier 79 and also connected to an input of the switch unit 64, and a second output terminal 92 connected to input terminals of the pulser 76 and the amplifier 80 and also connected a second input terminal of the switch unit 64. In one stable state of the flip-flop circuit 90, the pulser 75 and the amplifier 79 are operative while the switch unit 64 connects terminal 61 of the deflection circuit 56 to the movable contact of the potentiometer 67, thereby producing one or more traces on the screen 39 corresponding to the position of the transducer 11. In the second stable state of the flip-flop circuit 90, the pulser 76 and amplifier 80 are operative while the terminal 61 of the deflection circuit 76 is connected to the movable contact of potentiometer 68, so that one or more traces are produced on the face of the screen 39 corresponding to the position of the transducer 12.

As illustrated, a switching input terminal 93 is connected through a selector switch 94 to receive timing signals from the terminal 78 of the unit 36. In this mode of operation, one trace is produced from the transducer 11, the next trace is produced from the transducer 12, and then the next trace is produced from the transducer 11, and so on. However, if desired, the selector switch 94 may be moved to another position to apply timing signals from the terminal 78 to an input of a divider circuit 95 having an output connected to the input of the flip-flop circuit 90. In this mode of operation, a number of traces may be produced from the transducer 11, a like number of traces may be produced from the transducer 12 and the same number may be again produced from the transducer 11, and so on. It will be appreciated that the divider circuit 95 may operate with any desired division factor. By way of example, a large division factor could be used to allow production of an indication corresponding to a complete back and forth scan from each transducer.

In this connection, a specific feature of the invention resides in effecting a scanning movement of the transducers 11 and 12 at a rapid rate such as to produce indications of moving reflecting interfaces without flicker. In particular, the oscillations of the transducers back and forth should be effected at the rate of at least 7.5 complete oscillations per second, to produce 15 scans per second, and preferably the oscillations are effected at the rate of at least 10 oscillations per second to produce 20 scans per second. The oscillations are most preferably effected at an even higher rate to avoid distortions and to obtain an accurate indication of distance. The pulsing rate, i.e. the repetition rate of the timing signals applied to the pulsers 75 and 76 or the repetition rate of the sawtooth signals applied to the resolver stator coil 46, should be much higher than the scanning rate, preferably on the order of 500 per second, in order to avoid distortions of the pattern on the screen 39 and in order to obtain the highest possible accuracy.

By using a plurality of transducers in accordance with this invention, it is possible to obtain both the compound scan effect and the fast scan operation, which would be virtually impossible with systems of the prior art, using only a single transducer. This advantage arises from the fact that with the system of this invention, the position from and at which the ultrasonic energy is transmitted and received can be shifted electronically, whereas with a single transducer, a mechanical shift in position is required.

Referring now to FIGURE 4, the deflection circuit 56 comprises a keyed clamp circuit 98 having input terminals connected to the terminals 53 and 54 which are connected to the rotor coils 47 and 48, and having a pair of output terminals 99 and 100 conneced to input terminals of a cathode follower circuit 102 having output terminals connected to the terminals 57 and 58. The keyed clamp circuit 98 operates to fix the signal level at the output terminals 99 and 100 thereof during time intervals between the applied sawtooth signals. To control operation of the keyed clamp circuit 98, input terminals 103 and 104 thereof are connected to output terminals of a clamp driver circuit 106 having input terminals 107 and 108 connected to output terminals of a phase splitter circuit 110 having an input terminal connected to the terminal 72 which is connected to the terminal 73 of the unit 36 to receive an unblanking pulse therefrom. The phase splitter 110 operates to apply square wave signals of opposite polarity to the clamp driver circuit 106 which in turn operates the keyed clamp circuit 98 to fix the levels during time intervals between the sawtooth signals.

The levels at which the signals are fixed are controlled to control the positions of the traces produced on the screen 39. In particular, terminals 61 and 62 are connected to terminals 111 and 112 of the keyed clamp circuit 98 and to terminals 113 and 114 of the cathode follower circuit 102. As above described, the terminal 61 is connected either to the movable contact of potentiometer 67 or the movable contact of potentiometer 68 and it operates to shift the base level of the horizontal deflection signal so that the trace or sector scan indication is shifted horizontally from one position to another in response to operation of the switch unit 64. The terminal 62 is connected to the movable contact of the potentiometer 70 so that adjustment of the potentiometer 70 adjusts the vertical position of the traces on the screen 39.

It is noted at this point that although the horizontal and vertical relationship of the movements and indications is generally preferred, the movements can be effected in any direction, and the terms horizontal and vertical are used herein only for ease and clarity of description, and are not to be construed as limitations.

Referring now to FIGURES 5–7, reference numeral 114 generally designates a system which is particularly designed for use as an encephalographic system for the examination of the brain. In the illustrated system 114, a pair of transducers 115 and 116 are engaged with opposite ends of a patient's head while another pair of transducers 117 and 118 are engaged with opposite sides of the head. The transducers 115–118 are supported to transmit and receive in a common horizontal plane while being oscillated about parallel vertical axes in approximate alignment with the surface portions of the head engaged by the faces of the transducers 115–118.

To so support and oscillate the transducers 115–118, four units 119–122 are provided each having a construction substantially the same as that of the unit 14 shown in FIGURES 1 and 2, except of course without the support arrangement used for the second transducer 12 and without the link 24.

To obtain the desired engagement between the transducers 115–118 and surface portions of the head, the units 119–122 are supported from a frame 124 for adjustable movement toward or away from the central axis. In particular, the units 119–122 are carried on supports 125–128 having opposite end portions journaled for rectilinear movement on pairs of rods 129–132, the outer ends of the rods being secured to fixed supports 133–136 upstanding from the frame 124. Lead screws 137–140 are threaded through the fixed supports 133–136 and are connected to the movable supports 125–128, suitable hand wheels 141–144 being secured to the outer ends of the lead screws 137–140.

To provide proper correlation of indications produced from the four units, sensing means are provided responsive to the positions of adjustment of the units, in the form of four linear potentiometer units 145–148 affixed to the supports 133–136 and connected to the movable supports 125–128.

The units 119–122 are provided with electric drive motors and potentiometers which are connected to suitable energizing and control apparatus to obtain the desired oscillatory movement thereof at the desired speed. In addition, the units 119–122 incorporate resolvers which are connected to an A-scan unit 150 having a cathode ray tube with a screen 151 and a B-scan unit 152 having a cathode ray tube with a screen 153, the A-scan and B-scan units 150 and 152 having constructions substantially the same as the units 136 and 138 described above in connection with FIGURE 3.

In particular, stator coils of the resolvers in units 119–122 are connected to the output of an amplifier 154 having an input connected to a terminal 155 of the unit 150, at which a sawtooth sweep signal is developed. Rotor coils of the resolvers in the units 119–122 are connected through lines 157–160 to input terminals of deflection ciruits 161–164, each having a circuit the same as the deflection circuit 56 as illustrated in FIGURE 4. Output terminals of the deflection circuit 161–164 are connected through lines 165–168 to terminals of switch units 169–172 having output terminals which are connected to terminals 173 and 174 of he units 152. Terminals 173 and 174 are connected directly or through amplifier circuits in the unit 152 to the horizontal and vertical deflection plates or coils of the cathode ray tube therein.

As described hereinafter, cyclically operable control signal generating means are provided for sequentially operating the switch units 169–172 such that the output of the deflection circuit 161 is applied to terminals 173 and 174 during a first portion of a cycle, the output of the deflection circuit 162 is applied during a second portion of the cycle, the output of the deflection circuit 163 is applied during a third portion of the cycle, and the output of the deflection circuit 164 is applied during a fourth portion of the cycle. Thus, sector scan indications are sequentially produced from the units 119–122.

To control the apex point of the sector scan indication produced from the unit 119, terminals 175 and 176 of the deflection circuit 161 are connected to the movable contact of the potentiometer 145 and the movable contact of a potentiometer 177, potentiometers 145 and 177 being connected between ground and a power supply terminal 178. Similarly, terminals 179 and 180 of the deflection circuit 162 are connected to the movable contacts of the potentiometer 146 and a potentiometer 181 which are connected between ground and a power supply terminal 182. Terminals 183 and 184 of the deflection circuit 163 are connected to the movable contacts of a potentiometer 185 and the potentiometer 147 which are connected between ground and a power supply terminal 186. Terminals 187 and 188 of the deflection circuit 164 are connected to the movable contacts of a potentiometer 189 and the potentiometer 148 which are connected between ground and a power supply terminal 190.

Unblanking pulses are applied to the deflection circuits 161–164 from a common line 191 connected to a terminal 192 of the unit 150.

The transducers 115–118 are respectively connected to pulsers 193–196 and amplifiers 197–200. Input terminals of the pulsers are connected together and to a terminal 201 of the unit 150. Output terminals of the amplifiers 197–200 are connected together and to a terminal 202 of the unit 150 and also to an input terminal 203 of a mixer 204 having an output terminal connected to an input terminal of a video amplifier 205 which has an output terminal connected to a terminal 206 of the unit 152. Terminal 206 is connected either directly or through an amplifier in the unit 152 to the grid of the cathode ray tube therein to intensify the electron beam and brighten the spot in response to echo signals produced by the transducers 115–118. A second input terminal 207 of the mixer 204 is connected to the output of a ramp generator 207 having an input connected to the terminal 202 of the unit 150. A third input terminal 209 of the mixer 204 is connected to the unblanking pulser output terminal 192 of the unit 150.

To control the sequential operation of the transducers 115–118 and to control the sequential production of indications therefrom and from the units 119–122, control signal generating means are provided, generally indicated by reference numeral 210. In particular, a flip-flop 211 is provided having an input terminal 212, a pair of output terminals 213 and 214 at which output signals are developed in the respective states of the flip-flop 211, and having an additional output terminal 215 for applying a triggering signal to a second flip-flop 216 having a pair of output terminals 217 and 218.

A first gate circuit 219 is provided having inputs connected to terminals 213 and 217, a second gate circuit 220 has inputs connected to terminals 214 and 217, a third gate circuit 221 has inputs connected to terminals 213 and 218, and a fourth gate circuit 222 has inputs connected to terminals 214 and 218. With this arrangement and with timing pulses applied to the input terminal 212 of flip-flop 211, a control signal is developed at the output of gate 219 during a first portion of a cycle, a control signal is developed at the output gate 220 during a second portion of a cycle, a control signal is developed at the output of gate 221 during a third portion of a cycle, and a control signal is developed at the output of gate 222 during a fourth portion of a cycle.

In the system illustrated, the output of gate 219 is applied to switch unit 169, pulser 193 and amplifier 197, the output of gate 220 is applied to switch 171, pulser 195 and amplifier 199, the output of gate 221 is applied to switch unit 170, pulser 194 and amplifier 198, and the output of gate 222 is applied to switch unit 172, pulser 196 and amplifier 200. Thus, the transducers are energized and indications are produced therefrom in the order of transducer 115, transducer 117, tranducer 116, and transducer 118.

Triggering pulses developed at the output terminals 202 of the unit 150 may be applied through a selector switch 224 directly to the input terminal 212 of the flip-flop 211, so that the trace indications are produced in sequence, a first trace being produced from the transducer 115, the next trace from the transducer 117, the next trace from the transducer 116, and the final trace of each cycle from the transducer 118. In the alternative, triggering signals may be applied through the selector switch 224 to the input of a divider circuit 225 having an output connected to the input terminal 212 of the flip-flop 211 so that the duration of each cycle is increased, and so that a number of traces may be developed from each transducer during the portion of the cycle in which it is operative.

It will be understood that modifications and variations may be effected without departing from the spirit and scope of the novel concepts of this invention.

We claim as our invention:

1. In ultrasonic testing apparatus, a plurality of transducer means for transmitting ultrasonic energy in beams into a body under test and for receiving echoes from inhomogeneities within the body to develop echo signals, pulsing means for pulsing said transducer means, oscillating means for effecting oscillatory movements of said plurality of transducer means to produce transverse scanning movements of said beams through portions of the body, and indicating means comprising oscilloscope means having a screen and means for producing a spot on said screen, position signal means for supplying position signals corresponding to the respective spaced positions and angular positions of said plurality of transducer means, control signal generating means operable cyclically with different portions of each cycle respectively allocated to said plurality of transducer means, deflection means for deflecting said spot on said screen, means controlled by said control signal generating means and operable during each cycle thereof to sequentially apply said position signals to said deflection means to sequentially produce traces on said screen at spaced and angular positions respectively corresponding to the spaced and angular positions of the beams transmitted from said transducer means, and gating means controlled from said control signal generating means to operate during each cycle thereof to sequentially apply echo signals from said plurality of transducer means to intensify said spot during production of said traces.

2. In apparatus as defined in claim 1, the positions and oscillatory movements of said transducers being such that a part of the portion of the body scanned by each beam is also scanned by another of said beams.

3. In apparatus as defined in claim 1, said transverse scanning movements being effected at a rate of at least 15 scanning movements per second.

4. In apparatus as defined in claim 1, said oscillatory movements of said plurality of transducer means being effected about spaced generally parallel axes.

5. In apparatus as defined in claim 1, said plurality of transducer means having end faces for effective direct contact with spaced surface portions of a body, and said oscillatory movements being effected about axes generally parallel to said surface portions and in approximate alignment with said end faces.

6. In apparatus as defined in claim 1, said transducer means including first transducer means having an end face for engagement with one side surface portion of a head and second transducer means having an end face for engagement with one end surface portion of said head for transmitting said ultrasonic energy in beams into the brain, and said oscillatory movements being effected about parallel axes generally parallel to said surface portions and in approximate alignment with said end faces.

7. In apparatus as defined in claim 1, said plurality of transducer means comprising first and second transducer means having end faces for engagement with opposite side surface portions of a head and third and fourth transducer means for engagement with opposite end surface portions of the head, a frame, means supporting said transducer means on said frame for adjustable movement of said end faces into engagement with said surface portions and for oscillatory movements about parallel axes generally parallel to said surface portions and in approximate alignment with said end faces.

8. In apparatus as defined in claim 1, said oscillating means including means mechanically interconnecting said plurality of transducer means for synchronized oscillatory movement about generally parallel axes.

9. In apparatus as defined in claim 8, said position signal means including resolver means for supplying signals corresponding to the angular position of all of said transducer means and including means for supplying additional position signals corresponding to the spacing of said axes.

10. In apparatus as defined in claim 1, said oscillating means including separate drive units for independently oscillating said plurality of transducer means.

11. In apparatus as defined in claim 10, said position signal means including separate means for supplying position signals respectively corresponding to the spaced and angular positions of said plurality of transducer means.

12. In apparatus as defined in claim 1, means for operating said control signal generating means at a rate equal to a sub-multiple of the rate of pulsing of said transducer means.

13. In apparatus as defined in claim 12, means for operating said control signal generating means at a rate equal to the rate of pulsing of said transducer means divided by at least twice the number of said transducer means.

14. In apparatus as defined in claim 1, said deflection means comprising a pair of means to deflect said spot in transverse directions and sweep means arranged to periodically generate a sawtooth signal in synchronism with the pulsing of said transducer means, and said position signal means comprising resolver means responsive to oscillatory movement of said transducer means and responsive to said sawtooth sweep signal to develop sawtooth output signals having amplitudes varying according to sine and cosine functions of said oscillatory movements, and means applying said sawtooth output signal to said deflection means.

15. In apparatus as defined in claim 14, said deflection circuit means further including keyed clamp circuit means operative during time intervals between application of said sawtooth sweep signal to said resolver means for fixing the base levels of said sawtooth output signals in accordance with the spacing of said transducer means.

16. In apparatus as defined in claim 14, said resolver means comprising a common resolver mechanically coupled to all of said transducer means, and switching means in said control signal generating means arranged to control said keyed clamp means to shift said base levels of said sawtooth output signals in accordance with the spaced positions of said transducer means.

17. In ultrasonic apparatus as defined in claim 14, said resolver means comprising a plurality of separate resolvers respectively coupled mechanically to said transducer means, and said deflection means including a corresponding plurality of keyed clamp circuits operative during time intervals between application of said sawtooth sweep signals to said resolver means for fixing the base levels of said sawtooth output signals in accordance with the spaced positions of said transducer means, and switching means in said control signal generating means arranged to sequentially apply said sawtooth signals from said keyed clamp circuits to said deflection means.

References Cited

UNITED STATES PATENTS

| | | | |
|---|---|---|---|
| 3,086,390 | 4/1963 | Brown | 73—67.8 |
| 3,308,652 | 3/1967 | Appel et al. | 73—67.8 XR |

OTHER REFERENCES

Wild, John J., et al.: Ultrasonic Ranging Speeds Cancer Diagnosis, Electronics, March 1955, pp. 174–180 (73–67.9).

RICHARD C. QUEISSER, *Primary Examiner.*

JOHN P. BEAUCHAMP, *Assistant Examiner.*

U.S. Cl. X.R.

128—2.1